Aug. 29, 1939.  A. F. THENER  2,170,919
METHOD OF MAKING RUBBER ARTICLES
Filed Sept. 28, 1936

INVENTOR:
A. F. THENER,
By Albert J. McCauley
ATTORNEY.

Patented Aug. 29, 1939

2,170,919

UNITED STATES PATENT OFFICE 2,170,919

METHOD OF MAKING RUBBER ARTICLES

Arthur F. Thener, St. Louis, Mo., assignor to Cupples Company, St. Louis, Mo., a corporation of Missouri Application September 28, 1936, Serial No. 102,960

2 Claims. (Cl. 18—53)

This invention relates to methods of making rubber articles. In this art, the usual method of predetermining the hardness and dimensions of a finished rubber article consists in first producing a plastic raw rubber compound having a combination of constituents adapted to provide the desired degree of hardness, then shaping the plastic material into the form and dimensions desired in the finished article, and thereafter vulcanizing the formed article. The degree of hardness is ordinarily determined by the constituents of the plastic raw material, and the ultimate shape and dimensions of the vulcanized article usually conforms approximately to the previous form of the plastic raw rubber compound.

In some cases, the vulcanized rubber is sliced or otherwise severed to produce numerous vulcanized articles, but the hardness of the vulcanized rubber is ordinarily determined by the original raw compound. The shape and dimensions of the vulcanized rubber also conforms substantially to the raw plastic formation. For example, in the manufacture of jar rings and other rubber gaskets it is customary to form a tube of raw rubber compound, then vulcanize the tube, and thereafter slice the vulcanized tube to produce numerous vulcanized rings. In this old practice, the internal and external diameters of the ultimate rings conform approximately to the vulcanized tube, and the thickness of the rings corresponds to the thickness of the vulcanized slices. The hardness of the rubber depends primarily upon the constituents of the original compound.

In the foregoing example, an ordinary object is to economize in the quantity of raw rubber, and to also produce relatively soft and yieldable rubber gaskets. However, the old methods require a volume of raw rubber corresponding to the dimensions of the finished gaskets, and the hardness of the product depends mainly upon the constituents of the raw rubber. To increase the dimensions it is necessary to use additional raw rubber compound and to produce comparatively soft and yieldable gaskets in the old methods, a more expensive rubber compound must be employed.

In the manufacture of numerous other rubber articles it is desirable to minimize the hardness of the finished article, and to also economize in the quantity of raw rubber compound.

Therefore, one of the objects of the present invention is to economically enlarge vulcanized rubber articles, thereby reducing the volume of raw rubber required for each article.

Another object is to decrease the hardness of vulcanized rubber articles, so as to provide a yieldable condition heretofore obtained by more expensive rubber compounds.

A further object is to control or predetermine the dimensions and hardness of the enlarged vulcanized rubber. This result is important as it eliminates uncertainty that might arise from uncontrolled changes in the vulcanized rubber, and enables the operator to produce enlarged articles that are uniform as to size and quality.

More specifically stated, an object is to provide relatively large and soft jar rings, or other gaskets, from a comparatively small quantity of rubber compound that would ordinarily produce smaller and harder rubber gaskets.

With the foregoing and other objects in view, the invention comprises the novel method hereinafter more specifically described, but it is to be understood that the invention extends to changes, variations and modifications within the scope of the claims hereunto appended.

In the ordinary methods of producing rubber articles, the vulcanizing operation places the rubber in the condition intended for actual service, and any change in this predetermined condition may be undesirable. Accidental exposure to oil has resulted in objectionable changes in the vulcanized articles. As a consequence, oil has been regarded as a destructive deteriorating agent, to be carefully excluded from vulcanized rubber.

However, the results herein disclosed are preferably obtained by deliberately exposing the vulcanized rubber to oil, so that the oil is absorbed in the vulcanized rubber, thereby enlarging and softening the rubber articles. Instead of deteriorating the vulcanized rubber, this method increases the life of the rubber.

To accomplish these results it is convenient and advantageous to make several departures from the usual methods of manufacturing rubber articles. First, the raw rubber compound can be economically made of ingredients that will become relatively hard when subjected to the usual vulcanization. Second, a relatively small quantity of this rubber compound may be used to form articles smaller than the dimensions desired in the finished products. Third, the articles so formed are vulcanized, thereby producing vulcanized rubber articles that are harder and smaller than the predetermined finished products. Fourth, oil is deliberately introduced into these comparatively hard and small vulcanized articles until they are converted into the predetermined larger and softer rubber articles.

The step of adding the oil to the vulcanized rubber articles is a simple and inexpensive operation to be performed in any desired manner. For example, the vulcanized articles may be carried through a bath of oil where they are submerged for a period long enough to produce the desired enlargement of the rubber articles. If the oil is heated, it will be more readily absorbed by the vulcanized rubber, and this will reduce the time of treatment. A reduction in the time can also be obtained by subjecting the vulcanized rubber articles to oil under pressure. In any event, the oil is gradually absorbed by the rubber, which results in a corresponding enlargement of the vulcanized articles, and this operation is continued until the articles have the predetermined dimensions.

In carrying out the invention, I have found that the articles are uniformly enlarged by the absorbed oil, and that the time of treatment required to obtain the desired enlargement can be readily ascertained by preliminary tests. Thereafter, by adhering to the selected time factor, the enlarged rubber articles will be uniform in size, and of uniform quality; larger and more yieldable than the untreated vulcanized rubber articles.

As a specific illustration of one form of the invention, the accompanying drawing shows a simple vulcanized rubber article before and after it is subjected to the oil treatment.

Figure 1:
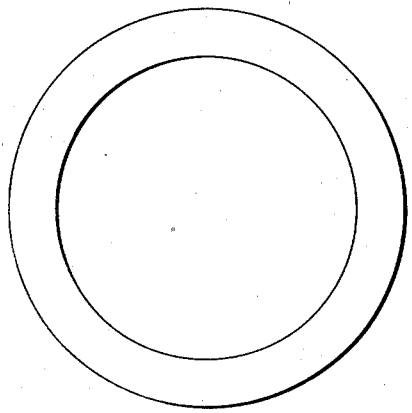
Fig. 1 illustrates a vulcanized rubber jar ring before it is exposed to the oil.
Figure 2:
Fig. 2 is an edge view of the ring shown in Fig. 1.

In manufacturing gaskets of this kind, it is customary to first form a tube of raw rubber that will vulcanize into a condition hard enough to permit rapid slicing of the tube. The tube is then vulcanized and sliced to produce numerous vulcanized rings. The ring shown in Fig. 1 may be regarded as one of these slices, hard enough for the usual slicing operation, but substantially smaller than the dimensions required in the finished product.

Figure 3:
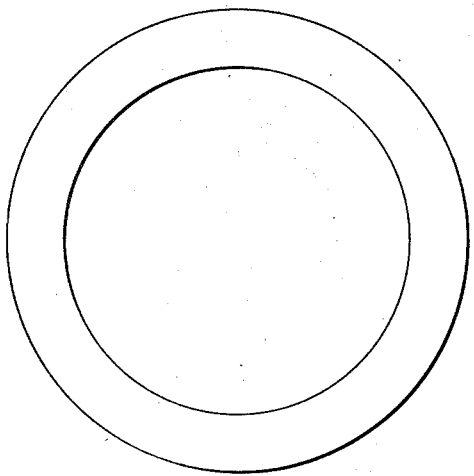
Fig. 3 illustrates the same ring after exposure to the oil.
Figure 4:
Fig. 4 is an edge view of the ring shown in Fig. 3.

To produce the larger and more yieldable article shown in Figures 3 and 4, I submerged the ring in oil at a temperature of 210° F. for a period of one hour. However, as previously indicated, the temperature and time of treatment can be varied to obtain different results, and the foregoing merely illustrates one specific example. The above mentioned temperature, which is preferably below the vulcanizing temperature, was conveniently obtained to avoid prolonged treatment in the oil. The original vulcanized ring shown in Fig. 1 had an internal diameter of $2\frac{5}{16}$ inches. The treated ring shown in Fig. 3 had an internal diameter of approximately $2\frac{11}{16}$ inches. The width and thickness of the vulcanized rubber were correspondingly increased. Furthermore, a decrease of about 20 per cent to 25 per cent in the hardness of the vulcanized rubber was obtained.

This substantial improvement in the quality of the vulcanized ring, together with the simultaneous enlargement of the article, was due entirely to the absorption of oil, and the ultimate dimensions were predetermined by the time of exposure to the oil which gradually increased the size, while reducing the hardness. The original ring was made of a relatively inexpensive rubber compound, hardened by vulcanization to a degree ordinarily desired for rapid slicing. By merely adding the oil, I produced the more yieldable rubber gasket without incurring the trouble and expense of slicing this comparatively soft rubber.

In other words, the comparatively inexpensive rubber compound was hardened by vulcanization to a degree ordinarily employed for convenient slicing of the rubber tube, but instead of producing rings having the usual hardness, the finished articles were more yieldable, and they were made from a relatively small quantity of the rubber compound. The manufacturing cost was substantially reduced, and the quality was very materially improved.

In the foregoing specific example, I employed a bleached mineral oil derived from petroleum, as the rings were to be used as gaskets on jars containing preserved fruit, or the like, and as a precaution I avoided the use of animal or vegetable oils that might leave a contaminating surface on the rubber. However, any desired oil can be employed, especially in the manufacture of gaskets not exposed to food products, or in the manufacture of rubber toys and numerous other rubber articles, where an advantage is gained by increasing the size and at the same time reducing the hardness of the vulcanized rubber.

When oil is deliberately employed as herein set forth, it is not a destructive, deteriorating agent. It is absorbed by and combined with the vulcanized rubber, so as to become an integral part of the rubber material, and in the example given, there was no free oil discharged by compression of the rubber articles. In some cases the absorbed oil has an advantage in excluding objectionable oils from the finished rubber article. For example, when used in the manufacture of jar rings, the oil absorbed in the vulcanized rubber will tend to prevent absorption of oily material in the jars, which might become rancid in the rubber rings.

However, the predetermined expansion and softening due to absorption of oil in vulcanized rubber articles is not limited to jar rings, or other gaskets. The method may be advantageously employed in deliberately treating any vulcanized rubber article, when it is desirable to enlarge and reduce the hardness of the vulcanized rubber.

I claim:

1. In the art of making rubber articles, the method which comprises forming a vulcanized rubber article more than 10 per cent harder than the predetermined hardness of the finished article, and more than 5 per cent smaller than the predetermined dimensions of the finished article, thereafter enlarging and at the same time reducing the hardness of said vulcanized rubber article, said simultaneous operations being performed by subjecting the relatively small vulcanized article to a drastic treatment in oil for a period longer than fifteen minutes, until it attains the predetermined hardness and dimensions of the finished article.

2. In the art of making rubber articles, the method which comprises forming a rubber article smaller than the dimensions desired in the finished article, vulcanizing the relatively small rubber article, thereafter submerging the vulcanized rubber article in oil at a temperature of about 210° F. for a period of about one hour to enlarge the vulcanized rubber to the dimensions desired in the finished article.

ARTHUR F. THENER.

CERTIFICATE OF CORRECTION.

Patent No. 2,170,919. August 29, 1939.

ARTHUR F. THENER.

It is hereby certified that the name of the assignee in the above numbered patent was erroneously described and specified as "Cupples Company" whereas said name should have been described and specified as Cupples Company, Manufacturers, of St. Louis, Missouri, a corporation of Missouri, as shown by the record of assignments in this office; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.